US006863991B1

(12) United States Patent
Coe et al.

(10) Patent No.: US 6,863,991 B1
(45) Date of Patent: Mar. 8, 2005

(54) COATED BIPERIODIC METALLIC MESH ARRAYS WITH MOLECULAR MONOLAYERS AND LIPID BILAYERS THEREON

(75) Inventors: James V. Coe, Worthington, OH (US); Shaun M. Williams, Columbus, OH (US); Kenneth R. Rodriguez, Columbus, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 10/428,148

(22) Filed: May 1, 2003

Related U.S. Application Data

(63) Continuation-in-part of application No. 10/426,906, filed on Apr. 30, 2003, now Pat. No. 6,797,405.
(60) Provisional application No. 60/377,170, filed on May 1, 2002.

(51) Int. Cl.[7] .............................................. B21F 27/00
(52) U.S. Cl. ...................... 428/598; 428/668; 428/669; 428/670; 428/671; 428/672; 428/673; 428/674; 428/675; 428/680; 428/704; 210/483; 205/122; 205/149; 205/150; 205/182; 205/263; 205/264; 205/266; 205/291
(58) Field of Search ........................ 428/598, 668–675, 428/680, 704; 210/483; 205/122, 149–150, 182, 263, 264, 266, 291

(56) References Cited

U.S. PATENT DOCUMENTS

| 4,410,454 A | * 10/1983 | Faschingbauer ............ 502/306 |
| 5,973,316 A | 10/1999 | Ebbesen et al. ............ 250/216 |
| 6,014,251 A | 1/2000 | Rosenberg et al. ......... 359/350 |
| 6,044,981 A | 4/2000 | Chu et al. ................... 210/490 |

OTHER PUBLICATIONS

Williams et al., Apr. 13, 2002, The Effect of Channel Width on the Transmission of Light by Metallic Biperiodic Grids When Wavelength is Comparable to Channel Width.

* cited by examiner

Primary Examiner—Deborah Jones
Assistant Examiner—Ling X. Xu
(74) Attorney, Agent, or Firm—Standley Law Group LLP

(57) ABSTRACT

A coated metallic mesh having a molecular layer thereon comprising: (1) a metallic mesh comprising at least one aperture; (2) a coating disposed on the metallic mesh that at least partially fills at least one aperture so as to form a partially-filled aperture; and (3) a molecular layer comprising at least one molecule having a hydrophilic region and a hydrophobic region, wherein the hydrophilic region at least partially extends into the partially-filled aperture. Also, provided are coated metallic meshes having bilayers and a method of providing a molecular layer to a coated mesh.

13 Claims, 11 Drawing Sheets

(a)            (b)

(a) (b)

1-Dodecanethiol SAM on Cu

Lit. $CH_2$ stretch absorption ~0.001 a.u., $CH_2$ bend ~0.0002

COATED BIPERIODIC METALLIC MESH ARRAYS WITH MOLECULAR MONOLAYERS AND LIPID BILAYERS THEREON

The present application is a continuation-in-part of U.S. application Ser. No. 10/426,906, filed Apr. 30, 2003 now U.S. Pat. No. 6,797,405, which claims priority to U.S. Provisional Application No. 60/377,170 filed May 1, 2002, entitled "Method for Uniform Electrochemical Reduction of Apertures to Micron and Submicron Dimensions Using Commercial Biperiodic Metallic Mesh Arrays and Devices Derived Therefrom".

TECHNICAL FIELD OF THE INVENTION

The present invention relates to coated biperiodic metallic mesh arrays having a molecular monolayer and/or lipid bilayers thereon.

BACKGROUND OF THE INVENTION

As used herein, a "portion smaller than a partially-filled aperture" means a portion of a molecule that is sufficiently small enough to at least partially extend into, if not completely through, an aperture that is at least partially coated as described herein. As used herein, a "portion larger than a partially-filled aperture" means a portion of a molecule that is sufficiently large enough not to at least partially extend into, an aperture that is at least partially coated as described herein.

This application incorporates by reference U.S. Provisional Application No. 60/377,170 filed May 1, 2002, entitled "Method for Uniform Electrochemical Reduction of Apertures to Micron and Submicron Dimensions Using Commercial Biperiodic Metallic Mesh Arrays and Devices Derived Therefrom".

Many techniques exist currently for filtering infrared, visible and ultraviolet radiation. Among these are: monochromators (grating or prism types), resonators (for example, Fabry-Perot type), multi-layer dielectric thin films on appropriate substrates, films or bulk materials having appropriate dielectric functions, absorbing colored filters, scatter filters, etc. In practice, all of these techniques are adversely affected, to varying degrees, by environmental factors such as heat, humidity, vibrations, etc.

It is therefore a goal of the present invention to construct metallic meshes with ordered arrays of micro-channels and nano-channels, to characterize their unusual optical and electrical properties, and to exploit their unusual properties in order to detect minute quantities of molecules within the micro- and nano-channels.

Practically speaking, it is a goal of the present invention to construct rugged metallic membranes with ordered arrays of micro- and nano-channels from a variety of metals including some (for example gold and silver) with a known potential for surface enhanced Raman spectroscopy and others (such as copper and platinum) with interesting catalytic properties. It is a further goal of the present invention to produce uniform ordered arrays through the membrane over a region of several square millimeters and with aperture widths from 2 to 6000 nanometers. Additionally, the present invention seeks to use electrical and optical detection techniques to know when and how quickly molecules (including bio-molecules) have moved in and out of the nano-channels. Finally, it is a further goal of the present invention to couple the detection methods to analytical techniques for exploring the potential of such techniques on the nano-scale.

The present invention may be utilized in the following applications: in physical separation and filtering, as in inkjet filters; to limit diffusion which may be important in drug delivery or sensor applications; for regulation and switching of ionic flow and molecular transport; as masks for quantum dot arrays; as a matrix for sensor arrays or lipid bi-layer arrays for bio-analysis; as detection elements in chemical separations and assays, such as "nano-capillary" electrophoresis; in solar selective absorbing surfaces, beam splitters, and optical bandpass filters; and in combinatorial work exploiting the arrays, i.e. put something in each channel. Of course, this list is by no means exhaustive of the potential applications in which the present invention may be employed. Rather, it is meant to be illustrative of the breadth of applications in which the present invention may be used.

SUMMARY OF THE INVENTION

Arrays of micro- and nano-channels represent one of the fundamental building blocks of nano-technology. The metallic meshes described herein are strong and flexible enough to be manipulated by hand or with a pair of tweezers. They can be transported without breaking. They may be pressed onto other membranes. They may also be heated without melting. In spite of being fairly rugged, the mesh contains an array of holes with hole-to-hole spacing on the order of microns and a hole diameter that can be closed down to nano-sizes. These meshes represent our interface to the nano-size regime and provide the scaffolding for nano-tech engineering.

The optical properties of grids and meshes become very interesting when the apertures become smaller than the wavelength of probing light. A single aperture (of a non-transparent material) exhibits diminished transmission as the wavelength of probing light becomes larger than the aperture. However, if the apertures are arranged in an ordered array, then long wavelength light can be passed when the wavelength matches the spacing between holes (due to constructive interference). For instance, we purchased commercial 2000 line/inch electro-formed nickel mesh (Buckbee-Mears brand) with 6.5 micrometer square apertures and hole-to-hole spacing of 12.5 micrometers which leaves nominally 26% of the mesh area as open space. Noting that transmission falls from 17 to 14% through the visible, this mesh actually transmits 77% of light around 700 cm$^{-1}$. Such bandpass phenomena are well known in grating science and are sometimes described as Wood's anomalies. Most of the mesh or grid devices described in the literature work in the far infrared. They are sometimes called "inductive grids" because their very long wavelength transmission properties can be modeled with an equivalent electrical circuit representation (parallel inductor and capacitor in series with a resistor). The advent of nano-technology or nano-dimensions within the meshes essentially involves pushing the far infrared band pass into the visible. If one wants to study molecules inside or on the surface of a nano-channel, then the constructively-interfering light transmitted by the mesh is particularly useful because only light that has had extensive interaction with the channel is transmitted, i.e. all transmitted photons have passed within less than a half wavelength of everything within the channel. Thus, one can use these membranes to select just the photons containing information about the nano-channel's contents.

The unusual mesh properties can be exploited to develop sensitive spectroscopic probes of species within the nano-channels. For instance, a metal micro- or nano-channel could be thought of as an optical cavity. Upon illumination of the channel cavity, one might expect the excitation of transverse modes and surface plasmon resonances. Such effects are well known in grating physics and have been exploited to probe proteins embedded in lipid bi-layers attached to thin metal films. We have developed a surface enhanced infrared absorption spectroscopy to detect monolayers and bilayers with a 100–1000 fold enhancement over literature methods. We expect to use mesh systems with surface plasmon resonances matched to a probing laser enabling surface enhanced Raman spectra (SERS) to be recorded for species on the surface of the nano-channel. The coupling of SERS with the unusual bandpass properties of metallic mesh arrays, presents an opportunity for a simple, sensitive, chemically specific, and yet remote means to assay the contents of mesh channels.

A coated metallic mesh having a molecular layer thereon of the present invention comprises: (1) a metallic mesh comprising at least one aperture wherein each aperture has at least one dimension less than about 10 microns; (2) a coating disposed on the metallic mesh that at least partially fills at least one aperture so as to form at least one partially-filled aperture; and (3) a molecular layer comprising at least one molecule having a portion smaller than the partially-filled aperture and a portion larger than the partially-filled aperture, wherein the portion smaller than the partially-filled aperture at least partially extends into the partially-filled aperture.

It is preferred that the metallic mesh comprises a material selected from the group consisting of nickel and composites thereof. It is further preferred that the coating comprises a material selected from the group consisting of copper, gold, platinum, silver, and composites thereof. It is even more preferred that that the coating is at least 1 nanometer thick.

The present invention also includes a coated metallic mesh array comprising at least two coated metallic meshes as described above.

A coated metallic mesh having a molecular layer thereon of the present invention comprises: (1) a metallic mesh comprising at least one aperture having at least one dimension less than about 10 microns; (2) a coating disposed on the metallic mesh that at least partially fills at least one said aperture so as to form at least one partially-filled aperture; and (3) a molecular layer comprising at least one molecule having a hydrophilic region and a hydrophobic region, wherein the hydrophilic region at least partially extends into a partially-filled aperture.

It is preferred that the at least one molecule is a lipid. It is even more preferred that the lipid is an alkanethiol. It is even more preferred that the alkanethiol is 1-dodecanethiol.

It is still further preferred that a coated metallic mesh of the present invention additionally comprises a second molecular layer adjacent the molecular layer so as to form a bilayer, wherein the second molecular layer comprises at least one molecule having a hydrophobic region. It is more preferred that the hydrophobic region of the second molecular layer is proximate the hydrophobic region of the molecular layer.

The present invention additionally comprises a coated metallic mesh having a bilayer wherein at least one biological molecule in said bilayer. Although the biological molecule may be any biological molecule of interest, exemplary biological molecules include DNA, RNA, and proteins.

The present invention further comprises a coated metallic mesh array comprising at least two coated metallic meshes as described above.

The present invention additionally provides for a method for providing a coated metallic mesh with a molecular layer. The method comprises the steps of: (1) providing a coated metallic mesh having at least one aperture that is at least partially filled by a coating; and (2) immersing the coated metallic mesh in a solution comprising at least one lipid for a sufficient duration so as to cause at least one lipid to assemble onto the coated metallic mesh.

It is preferred that each aperture have at least one dimension less than about 10 micrometers. Although the lipid may be any lipid of interest, it is preferred that the lipid is 1-dodecanethiol. It is similarly preferred that the coating is selected from the group consisting of copper, gold, platinum, silver, and composites thereof.

DETAILED DESCRIPTION OF THE PREFERRED EMBODIMENT(S)

As disclosed in U.S. Provisional Patent Application No. 60/377,170, incorporated herein in its entirety, we have developed an electrochemical procedure that uniformly reduces the 6.4 micrometer square holes of commercially available nickel (Ni) mesh (Buckbee-Mears, 278 E. 17$^{th}$ St., St. Paul, Minn. 55101) 2000 line/inch electro-formed Ni mesh to micro- and sub-micrometer dimensions by electro-depositing metal (copper in this case).

Figure 1:
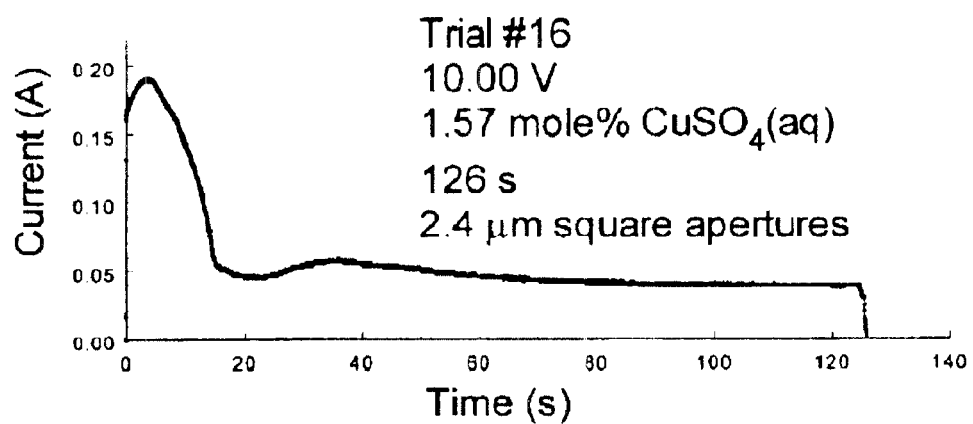
FIG. 1 shows electrochemical current versus time illustrating the initial burst producing uniformity in deposition.
Figure 2:
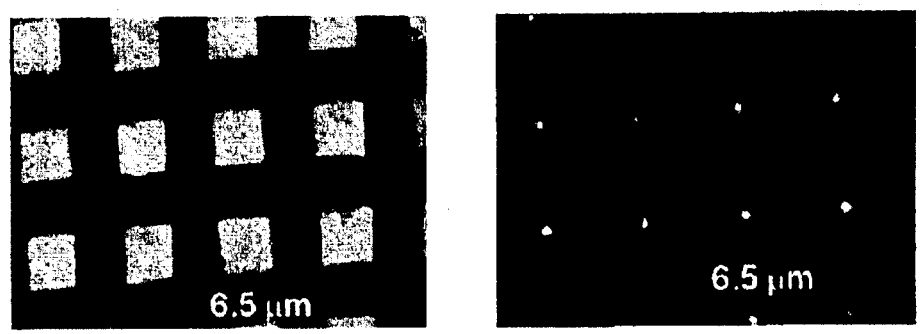
FIG. 2 provides a side by side comparison of transmission mode optical microscope images of Buckbee-Mears 2000 line/inch nickel mesh before (a) and after (b) coating with copper.
Figure 3:
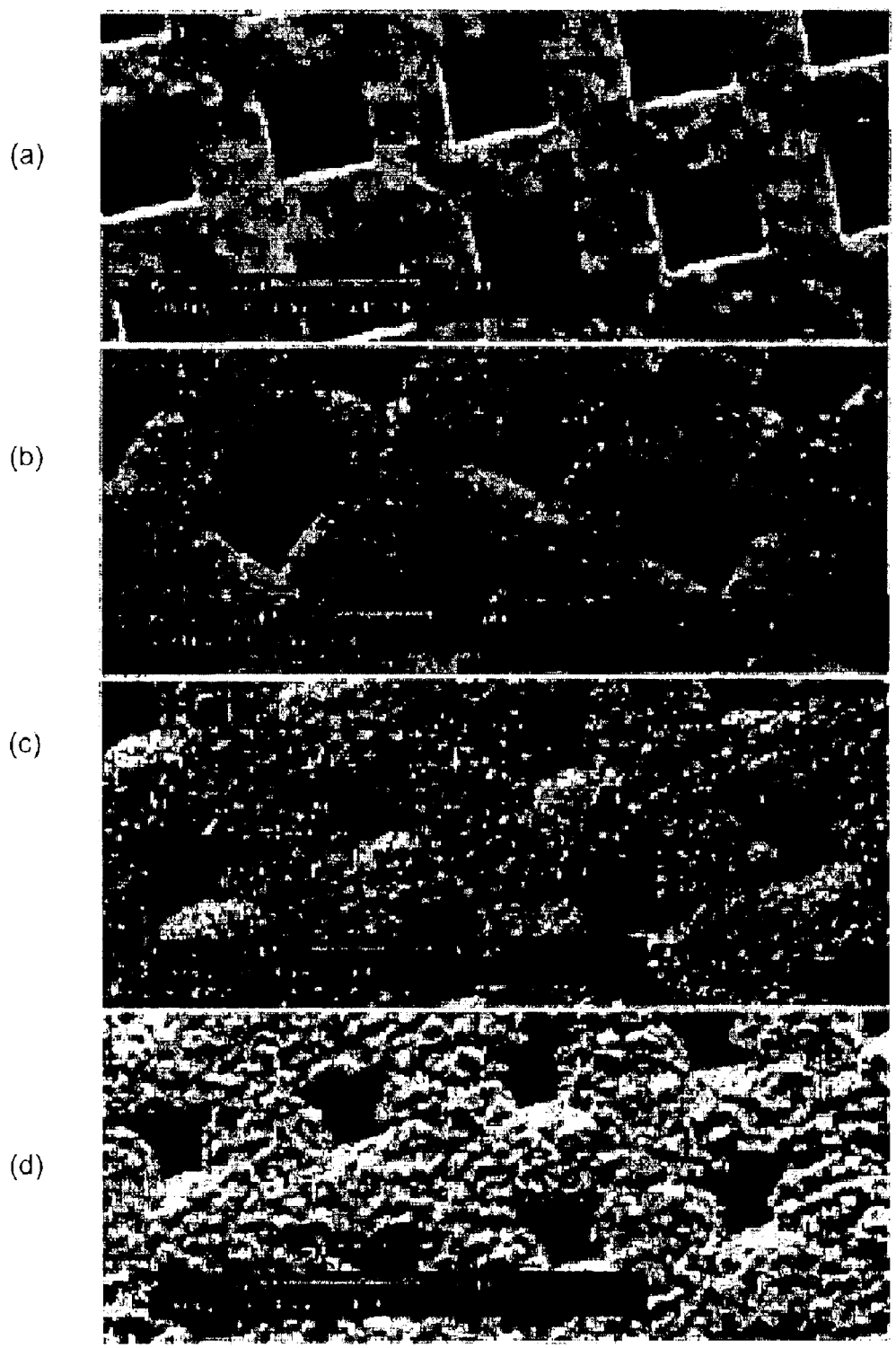
FIG. 3 provides SEM images of grids over the course of the deposition process illustrating how the apertures are reduced. In (a) the undeposited, original nickel mesh having a channel diameter of 6.5 $\mu$m and a channel-to-channel spacing of 12.5 $\mu$m. The second (b) through the fourth (d) images show grids where the copper has been electrodeposited for sequentially longer times producing channel widths of 4.2, 2.7, and 1.4 $\mu$m, respectively.

The key procedural step involves a specific electrochemical over-voltage (10 V) and an initial concentration of $CuSO_4$ solution (1.6 mole %) which produces a high current (~0.2 A) burst of deposition lasting about 10 seconds. As shown in FIG. 1, the high current burst of deposition subsides after 10 to 15 seconds. This is followed by a stage of much lower deposition current (~0.07 A) which is variably extended up to 110 seconds to produce the range of channel widths used in this work. FIG. 2 shows (a) the uncoated nickel mesh with an array of 6.5 $\mu$m apertures and (b) the coated mesh. A sequence of grids with their channels closed down to successively smaller widths is shown in FIG. 3. The resulting apertures are remarkably uniform and seem to retain the square cross section of the original apertures. The initial burst of high deposition current quickly lays down metal without regard to the thermodynamic stability of sites. This produces a very uniform initial coating much like the original mesh (see FIG. 3(b)). The second stage of lower current deposition is likely to be more thermodynamically controlled growth of crystallites (see the much larger copper crystals in (d) of FIG. 3). Channels can be closed to about 1 micrometer with these procedures at which point the growth of micro-crystals becomes comparable to the channel width. The channel diameters have been measured with both an optical microscope and a scanning electron microscope (SEM). The channel widths, % open area, and standard deviation of widths are presented in Table 1 as follows:

| Channel Width[a,b] ($\mu$m) | Std. Dev. Width[c] ($\mu$m) | Percent Open Area (%) |
|---|---|---|
| 6.53 | 0.16 | 27.3 |
| 4.72 | 0.13 | 14.3 |
| 4.06 | 0.32 | 9.1 |
| 2.66 | 0.13[d] | 4.5 |
| 2.23 | 0.28 | 3.2 |
| 1.11 | 0.16 | 0.8 |

[a]The optical widths were largely in agreement with corresponding SEM widths, i.e. within ~10%, obtained in more limited sampling.
[b]The average of one channel width from a random image within each of 20 areas that the ~3 × 4 mm area of mesh was divided into.
[c]The standard deviation of 20 channel widths from each area of the mesh.
[d]This deviation was taken from optical images of only a small area since this mesh was damaged in a subsequent experiment before images were recorded over the entire mesh's surface.

Figure 4:
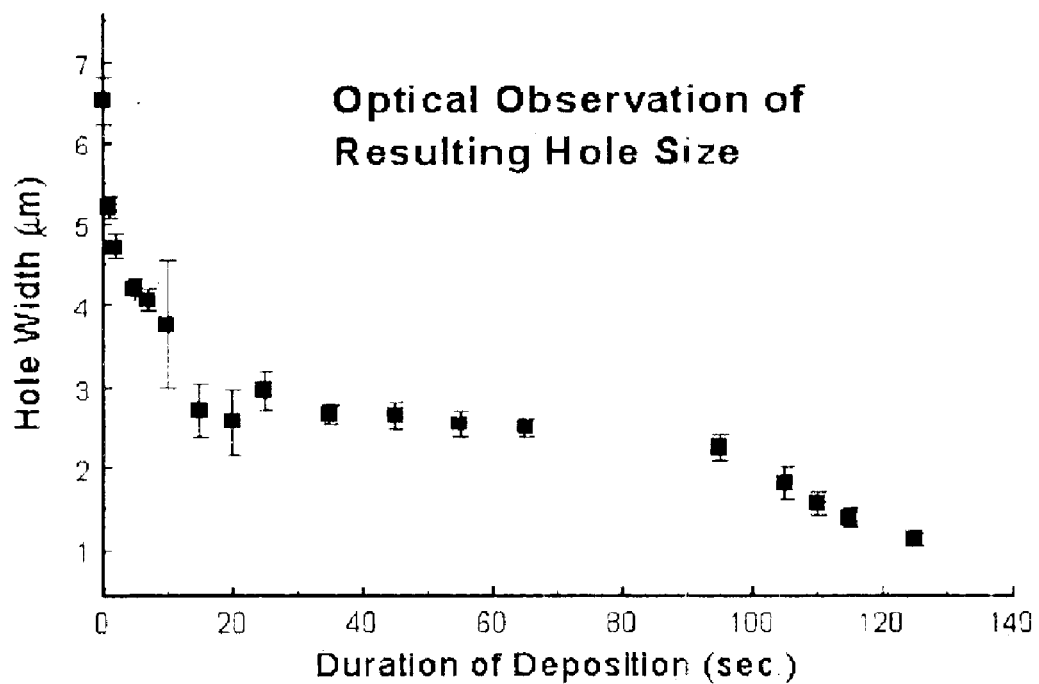
FIG. 4 compares the width of the mesh apertures versus the deposition time.

As illustrated in FIG. 4, as the duration of deposition increases the aperture reduces in size as would be expected.

Figure 5:
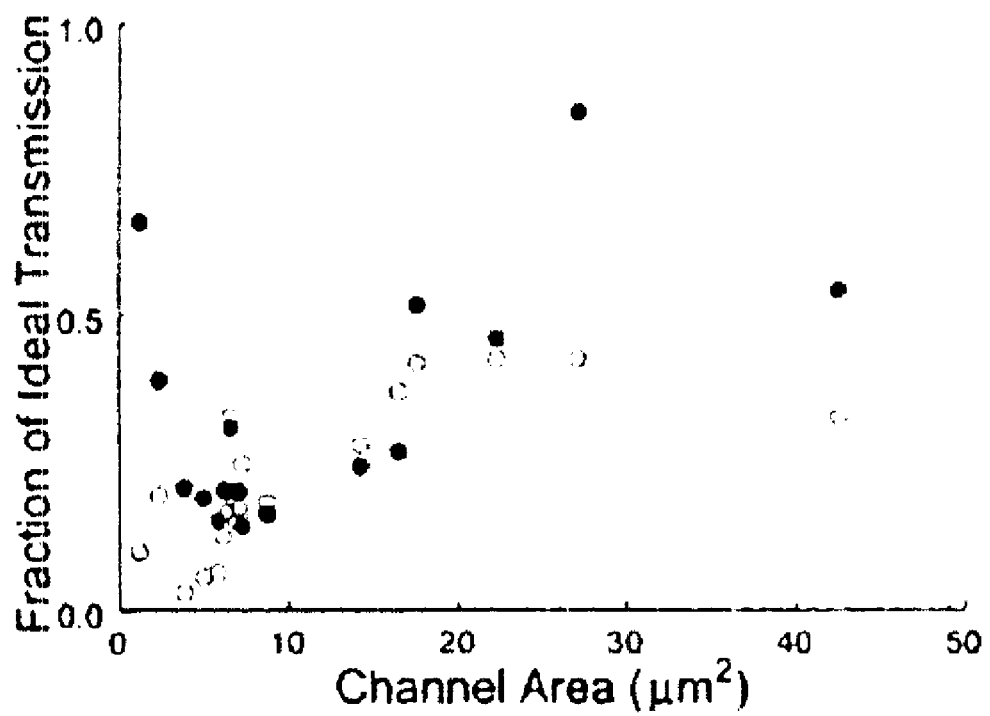
FIG. 5 illustrates the fraction of ideal particle transmission in the IR (open symbols) and uv-vis (closed symbols) ranges versus the channel area. Spectra in the IR and uv-vis were integrated and normalized to the integral of the % open area over the same spectral range and step size. Most of the grids fall into a range where there is a linearly decreasing fraction of ideal transmission with decreasing channel area. The visible data approach the ideal limit at large channel areas quicker than the IR data due to the shorter wavelength of visible light.

It is interesting to compare the transmission of IR and UV-vis light through the mesh with the transmission of ideal particles. IR spectra obtained from the meshes was normalized to the integral of the ideal particle transmission (column 2 of Table 1) to obtain the fraction of transmission for IR photons relative to the ideal case (see the open symbols in FIG. 5). The UV-vis spectra were integrated from 10,000–52,630 $cm^{-1}$ and similarly normalized (see the closed symbols in FIG. 5). The fraction of transmission relative to ideal, infinitely small, non-interacting particles is plotted against the channel areas in FIG. 5. Not only does transmission fall as channel width decreases, but also it falls relative to the ideal transmission. Reduced channel width effectively isolates photons having non-ideal interactions with the channel surfaces, i.e. grids with $\mu$m-sized apertures serve as filters which only transmit photons that have had extensive interactions with the channel surface. In fact, we have seen the IR absorption spectra of methoxy radical adsorbed on the surface of the copper channels in the IR band of light transmitted by several of our grids upon dipping in methanol. Clearly, the self-filtering nature of these grids has great potential for Raman spectroscopic probing of molecules on the surface of the channels.

Figure 6:
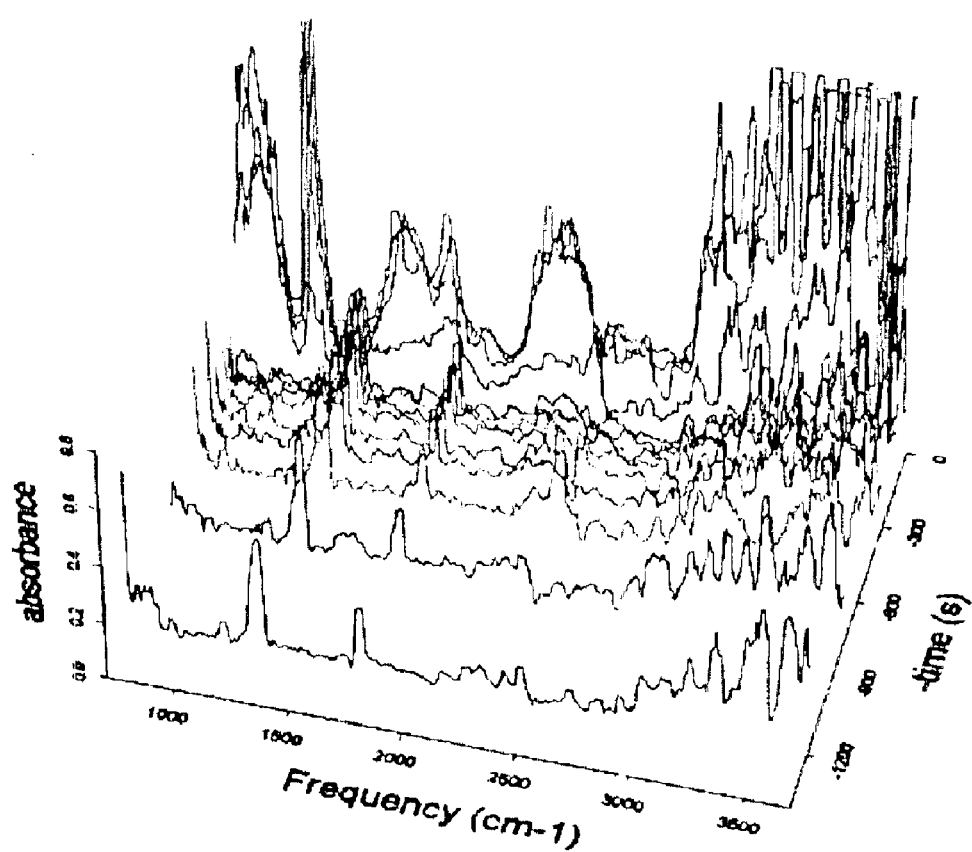
FIG. 6 shows a plot of infrared (IR) absorption spectra versus time after filling 2.7 $\mu$m copper micro-channels with liquid methanol. The liquid evaporates in about 20 seconds. The spectra get noisy at the low and high frequency extremes because there is little transmitted light in these regions. The spectra show the transformation of absorbed methanol to adsorbed methoxy radical with subsequent transformation to adsorbed formaldehyde and then formate—all at room temperature. Copper is a well-known industrial catalyst for such transformations.

INFRARED ABSORPTION SPECTRA OF MOLECULES ADSORBED ON THE MICRO OR NANOCHANNEL SURFACE—Our first spectroscopic experiments on detecting species within the micro-channels involved the use of the 2.7 $\mu$m mesh. We applied a drop of methanol to the mesh and recorded a sequence of infrared spectra over the course of an hour. We were surprised to witness the catalytic transformation of methanol to formaldehyde. The mesh had to be previously exposed to water in order to show catalytic activity on these timescales at room temperature. This probably creates reactive OH sites on the surface. It was noted that exposure to methanol or water (or just sitting in air for a few days which was similar to water exposure) washed away different regions of the spectrum, so the background was taken as the maximum transmission at a particular wavelength from any spectra taken during or before the sequence. Each spectrum shown in FIG. 6 is a ratio of the spectrum at a particular time to the background composite recorded by averaging for 30 seconds at 16 $cm^{-1}$ resolution. The liquid methanol seemed to evaporate in about 10 seconds as judged by the blurring of HeNe laser diffraction spots. The first spectra recorded after exposure to methanol shows a prominent transition at 1032 $cm^{-1}$ which can be assigned to methoxy radical adsorbed on the copper surface by the reflection absorption infrared spectra of Trenary and coworkers. There are also less intense transitions in the C-H stretch region that can be compared to work by Peremans, Masseri, Darville, and Gilles. The absorbed methoxy goes away in about two minutes and a product appears which is adsorbed formaldehyde. One can see the growth of peaks at 1288 and 1736 $cm^{-}$, which we currently assign to adsorbed formaldehyde. The adsorbed formaldehyde goes away on the time scale of an hour (in this case). Clearly a complicated story of catalysis of methanol by copper is playing out at room temperature. Copper is a well known industrial catalyst for preparing formaldehyde from methanol, and there is a great deal of work characterizing the catalytic transformation of methanol to formaldehyde and other species like formic acid and methyl formate on copper. This work supports the notion that upon adsorption of methanol on the copper surface, the methanol gives up a proton to the surface producing adsorbed methoxy radical. A number of fates are available to the methoxy depending on temperature, concentration, and other adsorbed species.

The most striking thing about these results is that no more than ¼ of a monolayer of methoxy radical is absorbing more than 90% of the light incident at its prominent vibrational transition. This has potential in the development of a sensor for methoxy. Also striking is the ease with which these results were obtained. We dipped a mesh in methanol, placed it in the department's simple FTIR spectrometer, and observed the spectrum of methoxy radical adsorbed on a copper surface. Usually, much more elaborate experimental configurations are required to observe the spectra of radicals on surfaces. This configuration is unusual because every transmitted photon has passed within a half-wavelength of everything within the channel.

Figure 7:
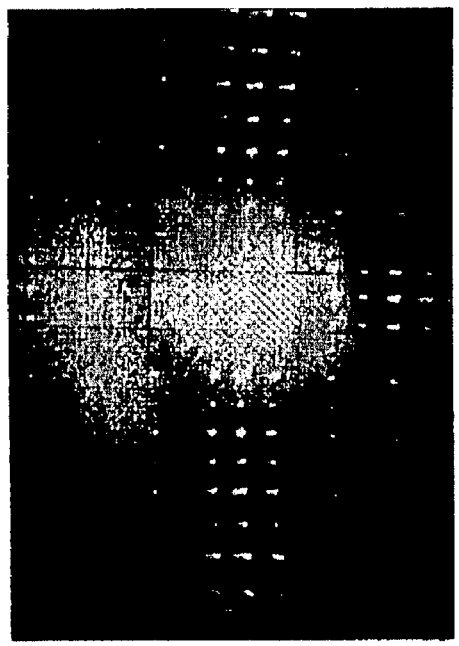
FIG. 7 provides diffraction patterns of HeNe laser on the original Buckbee-Mears mesh (a) and mesh that has been closed down to 2.3 $\mu$m (b).
Figure 7:
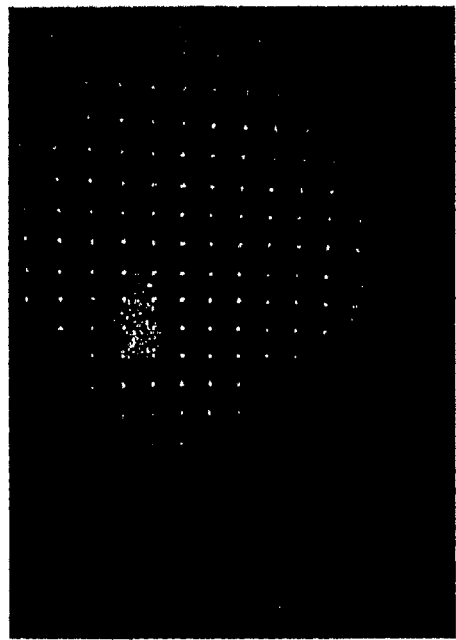

DIFFRACTION OF MESHES WITH REDUCED CHANNEL WIDTH—The ordered arrays in our meshes present beautiful diffraction patterns when illuminated by a HeNe laser. We placed a piece of graph paper about 16 cm beyond the mesh and photographed the pattern of spots produced by the original commercial mesh and mesh that had been closed down to 2.3 μm as shown in FIG. 7. The patterns extend beyond the 30° in scattering angle. The original mesh shows some interesting alternations and patterning which is attributable to the square cross section of the apertures. Upon deposition we see a more evenly diminishing pattern. These observations suggest that it may be useful to study light scattered at high angles to emphasize channel contents in Raman or absorption.

Figure 8:
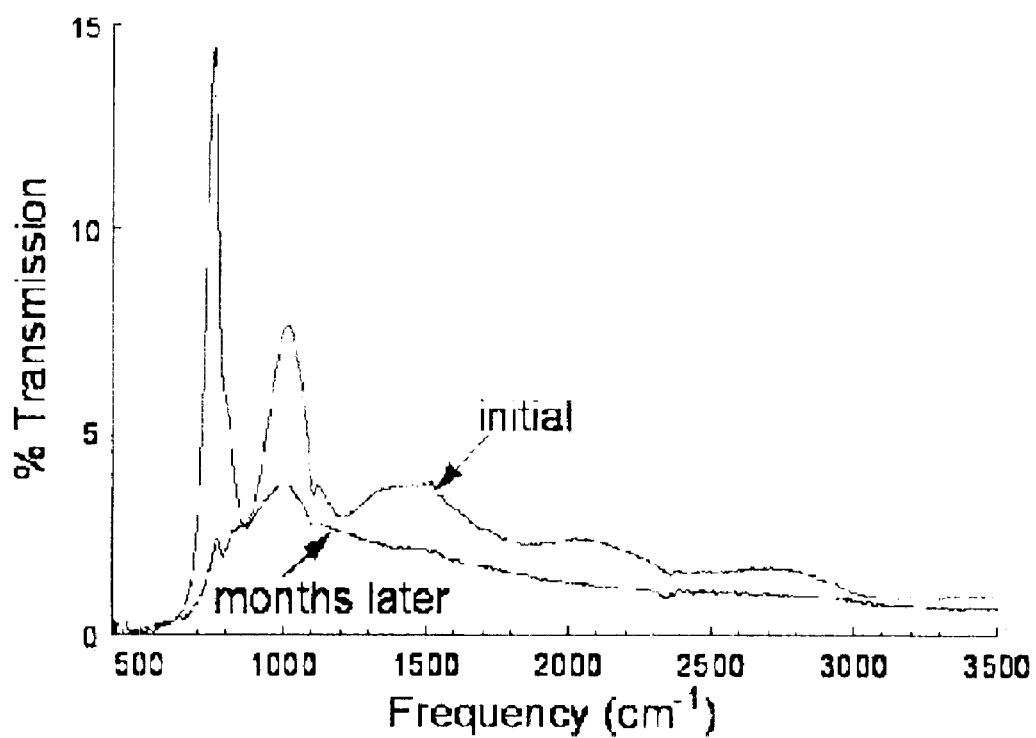
FIG. 8 provides the IR transmission spectra Cu-deposited mesh showing resonances of extraordinary transmission (red). Note that months later when oxidation destroys the metallic nature of the surface, the resonances are gone (blue).

As these coated meshes oxidized over several months, thereby destroying their metallic nature, they lost the ability to emit the extraordinary transmissions characteristic of the coated mesh in its early days. An example of this loss of extraordinary transmission is provided in FIG. 8.

The procedure for constructing a coated metallic mesh having a molecular layer thereon is provided below.

Figure 9:
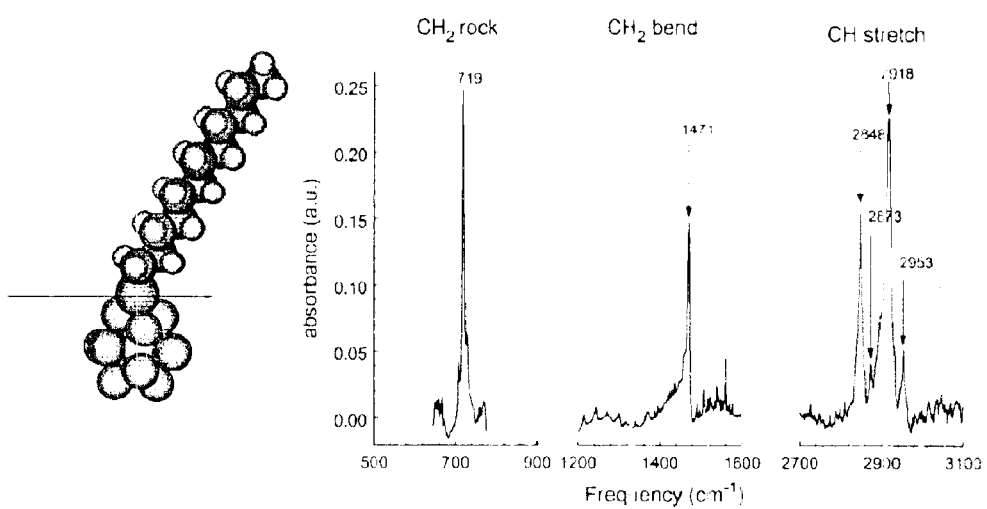
FIG. 9 illustrates the IR absorption spectra of a self-assembled monolayer of dodecanethiolate on a Cu-coated mesh showing enhancements of absorption from a factor of 100–1000 times literature observations.

In one preferred example, a coated mesh (produced in accordance with the teachings of U.S. Provisional Patent Application No. 60/377,170) is immersed in a solution of 1-dodecanethiol for 2 to 12 hours, during which time the 1-dodecanethiol self-assembles to the coated mesh, thereby aligning itself such that its hydrophobic ends are distal to the coated mesh. Through self-assembly a molecular monolayer is constructed on the coated mesh. Although self-assembled monolayers have previously been studied by RAIRS (reflection absorption infra-red spectroscopy) which typically yields absolute absorbances on the order of 0.001 on the C-H stretch, we can easily observe absorbances around 0.1 (see FIG. 9) and have seen as high as 0.25 (a 100 times increase). Further, the $CH_2$ bend is about 500 times more intense than the literature observations. It should be noted that these monolayers are not stable on the original Buckbee-Mears Ni mesh, only on the inventive coated mesh.

Figure 10:
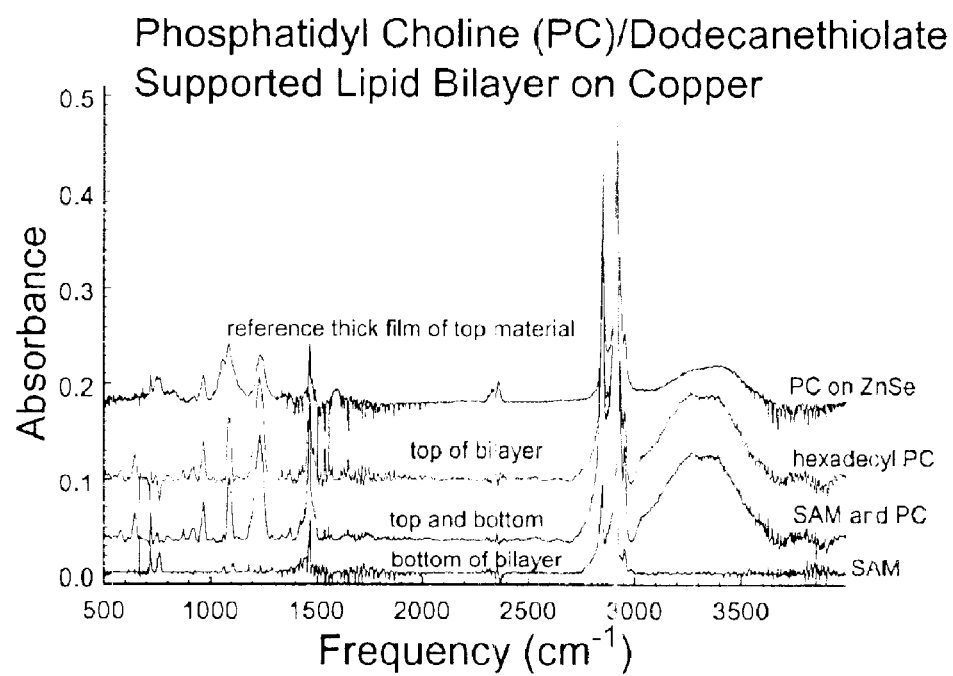
FIG. 10 depicts the IR absorption spectra of a lipid bilayer. The spectrum of the bottom layer can be subtracted from the top to yield the spectrum of the top layer alone (red). This can be compared to a thick film of Phosphatidyl Choline (PC).

In addition to the monolayer described above, a bilayer configuration can also be produced. The coated mesh with the dodecanethiolate monolayer is immersed into a solution of 20 mg of phospholipid (such as hexadecyl phosphatidyl choline) per 1 mL of dichloromethane for 2 seconds and allowed to dry for 10 seconds. The dipping is repeated until a monolayer is obtained. Repeated dipping can also produced multiple layers. During this immersion period the hydrophobic ends of the phosphatidyl choline align themselves proximate to the hydrophobic ends of the 1-dodecanethiolate monolayer. This configuration models the lipid bilayer of cells. These bilayers can be used to incorporate other biological molecules such as DNA or a host of membrane bound proteins. Incorporated DNA would show the same increased absorptions as illustrated above, thereby allowing for easy detection in a combinatorial-friendly geometry. FIG. 10 illustrates the IR absorption spectra of a lipid bilayer of the present invention. The spectrum of the bottom layer can be subtracted from the top to yield the spectrum of the top layer alone.

Figure 11:
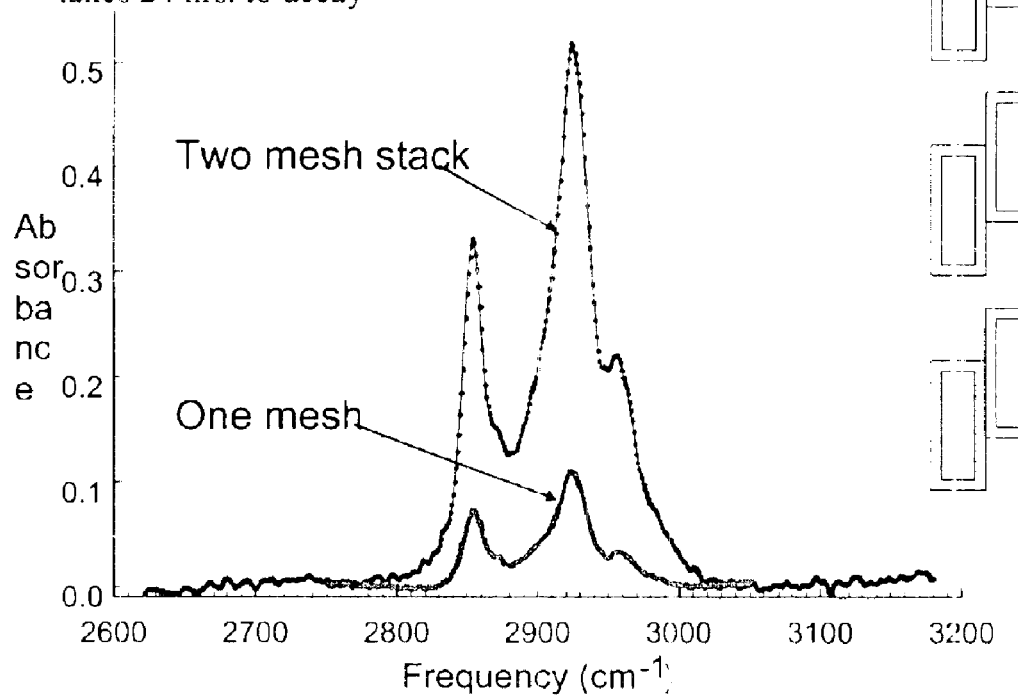
FIG. 11 illustrates the dramatic improvement in absorbance when two meshes of the present invention are stacked upon one another. Each coated mesh was immersed overnight in a 60 mM solution of 1-dodecanethiol in toluene or EtOH.

Further, it has been discovered that by laying the meshes one on top of the other, that even greater absorption enhancements can be obtained. In FIG. 11, we seen a fivefold increase in the absorbance even though the system is only twice as thick. Clearly light is being guided between the metal surfaces, through the lipid bilayer. The transmission shows an even greater enhancement relative to the fraction of open area than expected. The lipid bilayers enforce a nanoscale spacing between the metal mesh layers, i.e., a nanoscale photonic crystal.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which are incorporated herein be reference.

What is claimed is:

1. A coated metallic mesh having a molecular layer thereon, said coated metallic mesh comprising:
   a metallic mesh comprising at least one aperture;
   a coating disposed on said metallic mesh, said coating at least partially filling at least one said aperture so as to form at least one partially-filled aperture; and
   a molecular layer disposed on said coating, said molecular layer comprising at least one molecule having a first end and a second end, wherein at least a portion of said first end at least partially extends into said partially-filled aperture.

2. The coated metallic mesh according to claim 1, wherein said metallic mesh comprises a material selected from the group consisting of nickel and composites thereof.

3. The coated metallic mesh according to claim 1, wherein said coating comprises a material selected from the group consisting of copper, gold, platinum, silver, and composites thereof.

4. The coated metallic mesh according to claim 1, wherein said coating is at least 1 nanometer thick.

5. A coated metallic mesh array, said coated metallic mesh array comprising at least two coated metallic meshes according to claim 1.

6. A coated metallic mesh array, said coated metallic mesh array comprising at least two coated metallic meshes according to claim 1.

7. A coated metallic mesh having a molecular layer thereon, said coated metallic mesh comprising:
   a metallic mesh comprising at least one aperture;
   a coating disposed on said metallic mesh, said coating at least partially filling at least one said aperture so as to form a partially-filled aperture; and
   a molecular layer disposed on said coating, said molecular layer comprising at least one molecule having a hydrophilic region and a hydrophobic region, wherein said hydrophilic region at least partially extends into said partially-filled aperture.

8. The coated metallic mesh according to claim 7, wherein said at least one molecule is a lipid.

9. The coated metallic mesh according to claim 8, wherein said lipid is 1-dodecanethiol.

10. The coated metallic mesh according to claim 7, further comprising a second molecular layer adjacent said molecular layer so as to form a bilayer, wherein said second molecular layer comprises at least one molecule having a hydrophobic region.

11. The coated metallic mesh according to claim 10, wherein said hydrophobic region of said second molecular layer is adjacent to said hydrophobic region of said molecular layer.

12. The coated metallic mesh according to claim 11, further comprising at least one biological molecule in said bilayer.

13. The coated metallic mesh according to claim 12, wherein said biological molecule is selected from the group consisting of: deoxyribonucleic acid, ribonucleic acid, and proteins.

* * * * *

UNITED STATES PATENT AND TRADEMARK OFFICE
CERTIFICATE OF CORRECTION

PATENT NO. : 6,863,991 B1
DATED : March 8, 2005
INVENTOR(S) : Coe et al.

Page 1 of 1

It is certified that error appears in the above-identified patent and that said Letters Patent is hereby corrected as shown below:

Title page,
Item [56], References Cited, OTHER PUBLICATIONS, please delete "Williams et al., Apr. 13, 2002, The Effect of Channel Width on the Transmission of Light by Metallic Biperiodic Grids When Wavelength is Comparable to Channel Width." and insert -- Williams et al., Apr. 13, 2002, The Effect of Channel Width on the Transmission of Light by Metallic Biperiodic Grids When Wavelength is Comparable to Channel Width, pages 1-4. --.

Column 6,
Line 33, please delete "16cm⁻1" and insert -- 16 $cm^{-1}$ --.
Line 37, please delete "1032 cm⁻1" and insert -- 1032 $cm^{-1}$ --.
Line 45, please delete "1736 cm⁻," and insert -- 1736 $cm^{-1}$, --.

Signed and Sealed this

Twenty-fourth Day of May, 2005

JON W. DUDAS
*Director of the United States Patent and Trademark Office*